United States Patent
Olmstead (10) Patent No.: US 7,506,816 B2
(45) Date of Patent: Mar. 24, 2009

(54) SYSTEM AND METHOD FOR DETERMINING A THRESHOLD FOR EDGE DETECTION BASED ON AN UNDIFFERENTIATED EQUALIZED SCAN LINE SIGNAL

(75) Inventor: Bryan L. Olmstead, Eugene, OR (US)

(73) Assignee: Datalogic Scanning, Inc., Eugene, OR (US)

( * ) Notice: Subject to any disclaimer, the term of this patent is extended or adjusted under 35 U.S.C. 154(b) by 617 days.

(21) Appl. No.: 10/958,701

(22) Filed: Oct. 4, 2004

(65) Prior Publication Data

US 2006/0071078 A1    Apr. 6, 2006

(51) Int. Cl.
G06K 7/10    (2006.01)
(52) U.S. Cl. ............................. 235/462.01; 235/462.08
(58) Field of Classification Search ............ 235/462.01, 235/462.08, 462.1, 462.16, 462.26, 462.27, 235/462.29, 462.32
See application file for complete search history.

(56) References Cited

U.S. PATENT DOCUMENTS

| | | | | |
|---|---|---|---|---|
| 4,323,772 A | | 4/1982 | Serge ......................... 235/463 |
| 4,356,389 A | * | 10/1982 | Quirey et al. ............... 235/455 |
| 4,673,804 A | | 6/1987 | Filauro et al. ............... 235/463 |
| 4,740,675 A | * | 4/1988 | Brosnan et al. ......... 235/462.27 |
| 4,798,943 A | | 1/1989 | Cherry ....................... 235/463 |
| 5,019,698 A | | 5/1991 | Eastman ..................... 235/462 |
| 5,210,397 A | | 5/1993 | Eastman ..................... 235/436 |
| 5,329,105 A | * | 7/1994 | Klancnik et al. ........ 235/462.16 |
| 5,463,211 A | * | 10/1995 | Arends et al. .......... 235/462.27 |
| 5,661,288 A | | 8/1997 | Keinath et al. .............. 235/436 |
| 5,675,136 A | * | 10/1997 | Keinath et al. .............. 235/454 |
| 5,770,847 A | | 6/1998 | Olmstead .................... 235/462 |
| 5,777,311 A | | 7/1998 | Keinath et al. .............. 235/462 |
| 5,923,023 A | | 7/1999 | Arends et al. .......... 235/462.25 |
| 5,925,868 A | | 7/1999 | Arends et al. ............... 235/454 |
| 5,969,325 A | * | 10/1999 | Hecht et al. ............ 235/462.16 |
| 6,012,639 A | | 1/2000 | Colley et al. ........... 235/462.16 |
| 6,047,894 A | | 4/2000 | Arends et al. .......... 235/462.22 |

(Continued)

OTHER PUBLICATIONS

Bresenham's Line-Drawing Algorithm, available at www.funducode.com/freec/graphics/graphis2.htm, dated Aug. 24, 2004, 9 pgs.

(Continued)

*Primary Examiner*—Karl D. Frech
(74) *Attorney, Agent, or Firm*—Stoel Rives LLP (57) ABSTRACT

Methods and systems better detect edges in a binary optical code, such as a bar code. One method constructs a threshold signal to be used for comparison with an equalized undifferentiated scan line signal imperfectly representing a binary optical code. The method comprises detecting peaks in the equalized undifferentiated scan line signal; determining midpoints between successive detected peaks; and generating a smooth signal based on the midpoints. The generated signal is the threshold signal. In one version of the method, the generating step comprises interpolating between successive midpoints so as to result in a signal passing through the midpoints and low-pass filtering the signal passing through the midpoints so as to result in a filtered signal, which is the threshold signal. In another version of the method, the generating step comprises performing regression using the midpoints so as to generate a signal curve that fits the midpoints according to a criterion. Software, digital, and analog techniques are described.

44 Claims, 8 Drawing Sheets

U.S. PATENT DOCUMENTS

| | | | | |
|---|---|---|---|---|
| 6,129,279 | A | 10/2000 | Colley et al. | 235/462.16 |
| 6,202,928 | B1 * | 3/2001 | Boersma | 235/462.1 |
| 6,334,572 | B1 * | 1/2002 | Iwaguchi et al. | 235/462.27 |
| 6,343,741 | B1 | 2/2002 | Arends et al. | 235/462.25 |
| 6,499,662 | B1 * | 12/2002 | Coleman et al. | 235/462.18 |
| 7,007,847 | B2 * | 3/2006 | Iwaguchi et al. | 235/462.16 |
| 7,124,949 | B2 * | 10/2006 | Madej | 235/462.16 |

OTHER PUBLICATIONS

Bresenham's Algorithm, available at www.cs.helsinki.fi/group/goa/mallinnus/lines/bresenh.html, dated Aug. 24, 2004, 7 pgs.

International Search Report and Written Opinion, PCT/US2005/035261, Jul. 3, 2008.

Informal Comments on the International Search Report and Written Opinion, PCT/US2005/035261, Aug. 20, 2008.

* cited by examiner

SYSTEM AND METHOD FOR DETERMINING A THRESHOLD FOR EDGE DETECTION BASED ON AN UNDIFFERENTIATED EQUALIZED SCAN LINE SIGNAL

TECHNICAL FIELD

This disclosure relates generally to optical code readers, such as, for example, bar code readers, and more particularly to signal processing systems and methods for determining edge positions in a binary optical code.

BACKGROUND

Today bar codes are ubiquitously found on or associated with objects of various types, such as the packaging of retail, wholesale, and inventory goods; retail product presentation fixtures (e.g., shelves); goods undergoing manufacturing; personal or company assets; and documents. By encoding information, a bar code typically serves as an identifier of an object, whether the identification be to a class of objects (e.g., oranges) or a unique item (e.g., U.S. Pat. No. 6,012,639). Bar codes consist of alternating bars (i.e., relatively dark areas) and spaces (i.e., relatively light areas). The widths of the bars and spaces are often set to encode a desired information sequence, as the pattern of bars and spaces represents a string of binary ones and zeros, wherein the width of any particular bar or space is an integer multiple of a specified minimum width, which is called a "module" or "unit." Thus, to decode the information, a bar code reader must be able to reliably discern the locations of edges demarking adjacent bars and spaces from one another. The leading edge of a bar (i.e., a light-to-dark transition) is commonly denoted as an STV (set video), and the trailing edge of a bar (i.e., a dark-to-light transition) is commonly denoted as an RTV (reset video).

Optical scanning equipment can be utilized to generate an electrical signal indicative of the positions of bars and spaces in a bar code. A brief description of the optical scanning equipment that generates that signal is provided here, but a more complete introduction to the optical scanning of bar codes can be found in the background section of the above-noted U.S. Pat. No. 6,012,639, the entirety of which is incorporated by reference herein. Typical optical scanning equipment comprises one or more illumination sources and one or more photodetectors. The illumination source may be a laser producing a focused beam spot on a small area of the bar code. As the laser spot and the bar code move relative to each other, such that the spot is scanned across the bar code, a photodetector detects the laser light reflected off the bar code and produces an electrical signal whose magnitude is related to the optical power of the reflected signal. Thus, as the spot scans across the bar code, the photodetector generates an electrical signal whose variations over time at least roughly correlate to the spatial pattern of bars and spaces in the bar code. Alternatively, the illumination source may be diffuse across the entire bar code, and the bar code may be imaged using a charge-coupled device (CCD) camera or a CMOS (complementary metal-oxide-semiconductor) imager, either of which forms an electronic image of the bar code. That electronic image can be sampled in the forward direction of the bar code to generate a virtual scan line signal, which is like the scan line signal generated with a scanning laser spot. In any event, the result is an electronic scan line signal, which, at least ideally, somehow relates to the spatial positions of the bars and spaces in the bar code. The next step is to process that signal to determine with some reliability where the edges (STVs and RTVs) lie.

A conventional edge detection system typically processes a scan line signal using a gated peak detection scheme. In general functional terms, such a system operates by forming the first and second derivatives of the scan line signal and by detecting peaks of the first derivative, which ideally represent optical edges. To find the peaks of the first derivative, such a system detects the zero crossings of the second derivative. The magnitude of the first derivative is also compared to a threshold in order to prevent the output of low contrast or false edges.

However, a scan line signal is seldom a perfect representation of a bar code for a variety of reasons. For example, the scan line signal is usually corrupted by noise, which is amplified by differentiation. Noise can be attributable to the optical scanning equipment, the laser beam, poor bar code printing quality, poor substrate quality or roughness, inconsistent bar or space color, modulated lighting effects, etc. Furthermore, a scan line signal is often corrupted by inter-symbol interference (ISI), which can result from the laser spot size being large compared to the unit width. Additionally, variations in the depth of field (i.e., the distance between the bar code and the bar code reader) can induce variations in the laser beam spot size and thus affect the amount of ISI in the scan line signal.

Bar codes are just one example of the many types of optical codes in use today. In general, optical codes encode useful, optically-readable information about the items to which they are attached or otherwise associated. While bar codes generally encode information across one dimension, higher-dimensional optical codes are also possible, such as, two-dimensional matrix codes (e.g., MaxiCode) or stacked codes (e.g., PDF 417). Decoding optical codes in general poses the same challenges, such as noise and ISI, posed by bar codes in particular.

SUMMARY

The present invention is directed to methods and systems for facilitating better detection of transitions in a binary optical code signal, and thus better detection of edges in a binary optical code.

According to one embodiment, a method constructs a threshold signal to be used for comparison with an equalized undifferentiated scan line signal imperfectly representing a binary optical code. The method comprises detecting peaks in the equalized undifferentiated scan line signal; determining midpoints between successive detected peaks; and generating a smooth signal based on the midpoints. The generated signal is the threshold signal. In one version of the method, the generating step comprises interpolating between successive midpoints so as to result in a signal passing through the midpoints and low-pass filtering the signal passing through the midpoints so as to result in a filtered signal, which is the threshold signal. In another version of the method, the generating step comprises performing regression using the midpoints to generate a signal curve that fits the midpoints according to a criterion.

According to another embodiment, a threshold signal generator comprises a peak detector, a midpoint calculator, and signal curve generator. The peak detector has an input accepting an equalized scan line signal. The peak detector generates coordinates of local peaks in the scan line signal. The midpoint calculator has an input accepting the coordinates of the local peaks from the peak detector in their order of occurrence. The midpoint calculator generates coordinates of midpoints between successive peaks. The signal curve generator has an input accepting the coordinates of the midpoints from the midpoint calculator. The signal generator generates a signal that approximately fits the midpoints.

According to another embodiment, a method constructs a threshold signal to be used for comparison with an equalized undifferentiated scan line signal imperfectly representing a binary optical code. The method detects local peaks in an equalized undifferentiated scan line signal, wherein the peaks are either positive or negative peaks. The method generates a top curve based on the positive local peaks and a bottom curve based on the negative local peaks. The method creates a middle curve that is a pointwise average of the top curve and the bottom curve, wherein the middle curve is the threshold signal.

According to another embodiment, a threshold signal generator comprises a peak detector, a first signal curve generator, a second signal curve generator, and an averager. The peak detector has an input accepting an equalized scan line signal. The peak detector generates coordinates of local peaks in the scan line signal, wherein the local peaks are either positive or negative peaks. The first signal curve generator has an input accepting the coordinates of the positive local peaks from the peak detector. The first signal generator generates a first signal curve that approximately fits the positive local peaks. The second signal curve generator has an input accepting the coordinates of the negative local peaks from the peak detector. The second signal generator generates a second signal curve that approximately fits the negative local peaks. The averager has inputs accepting the first signal curve and the second signal curve. The averager generates an output that is the threshold signal, which is a pointwise average of the first and second signal curves.

According to another embodiment, a system binarizes an undifferentiated scan line signal imperfectly representing a binary optical code. The system comprises an equalizer, a first analog peak detector, a second analog peak detector, a threshold generator, and a binarizing comparator. The equalizer has an input accepting the undifferentiated scan line signal. The equalizer produces an output that is an equalized undifferentiated scan line signal. The first analog peak detector has an input accepting the equalized undifferentiated scan line signal. The first analog peak detector produces an output that approximates a top envelope of the equalized undifferentiated scan line signal. The second analog peak detector has an input accepting the equalized undifferentiated scan line signal. The second analog peak detector produces an output that approximates a bottom envelope of the equalized undifferentiated scan line signal. The threshold generator is connected to the first analog peak detector and to the second analog peak detector. The threshold generator produces one or more threshold signals on the basis of the outputs of the first analog peak detector and the second analog peak detector. The binarizing comparator has inputs receiving the equalized undifferentiated scan line signal and the one or more threshold signals. The binarizing comparator produces a binary version of the equalized undifferentiated scan line signal based on the one or more threshold signals.

According to yet another embodiment, a system binarizes an undifferentiated scan line signal imperfectly representing a binary optical code. The system comprises a first, second, and third analog peak detector, a threshold generator, an equalizer, and a binarizing comparator. The first analog peak detector has an input accepting the equalized undifferentiated scan line signal. The first analog peak detector produces an output that approximates a top envelope of the equalized undifferentiated scan line signal. The first peak detector has a first decay time constant. The second analog peak detector has an input accepting the equalized undifferentiated scan line signal. The second analog peak detector produces an output that approximates a bottom envelope of the equalized undifferentiated scan line signal. The second peak detector has a second decay time constant approximately equal to the first time constant. A third analog peak detector has an input accepting the equalized undifferentiated scan line signal. The third analog peak detector produces an output that approximates a bottom envelope of the equalized undifferentiated scan line signal. The third peak detector has a third decay time constant longer than either the first of the second decay time constant. The threshold generator is connected to the first, second, and third peak detectors. The threshold generator produces a threshold signal on the basis of the outputs of the first, second, and third analog peak detector. The equalizer has an input accepting the undifferentiated scan line signal. The equalizer produces an output that is an equalized undifferentiated scan line signal. The binarizing comparator has inputs receiving the equalized undifferentiated scan line signal and the threshold signal. The binarizing comparator produces an output signal that is high only when the equalized undifferentiated scan line signal exceeds the threshold signal.

Details concerning the construction and operation of particular embodiments are set forth in the following sections.

DETAILED DESCRIPTION OF EMBODIMENTS

With reference to the above-listed drawings, this section describes particular embodiments and their detailed construction and operation. Certain embodiments are capable of achieving certain advantages over the known prior art, including some or all of the following: improved edge detection performance under challenging detection conditions in the presence of noise, ISI, poor laser spot quality, poor bar code print quality, and/or small bar code feature size; and improved performance at various field depths. These and other advantages of various embodiments will be apparent upon reading the following.

Figure 1:
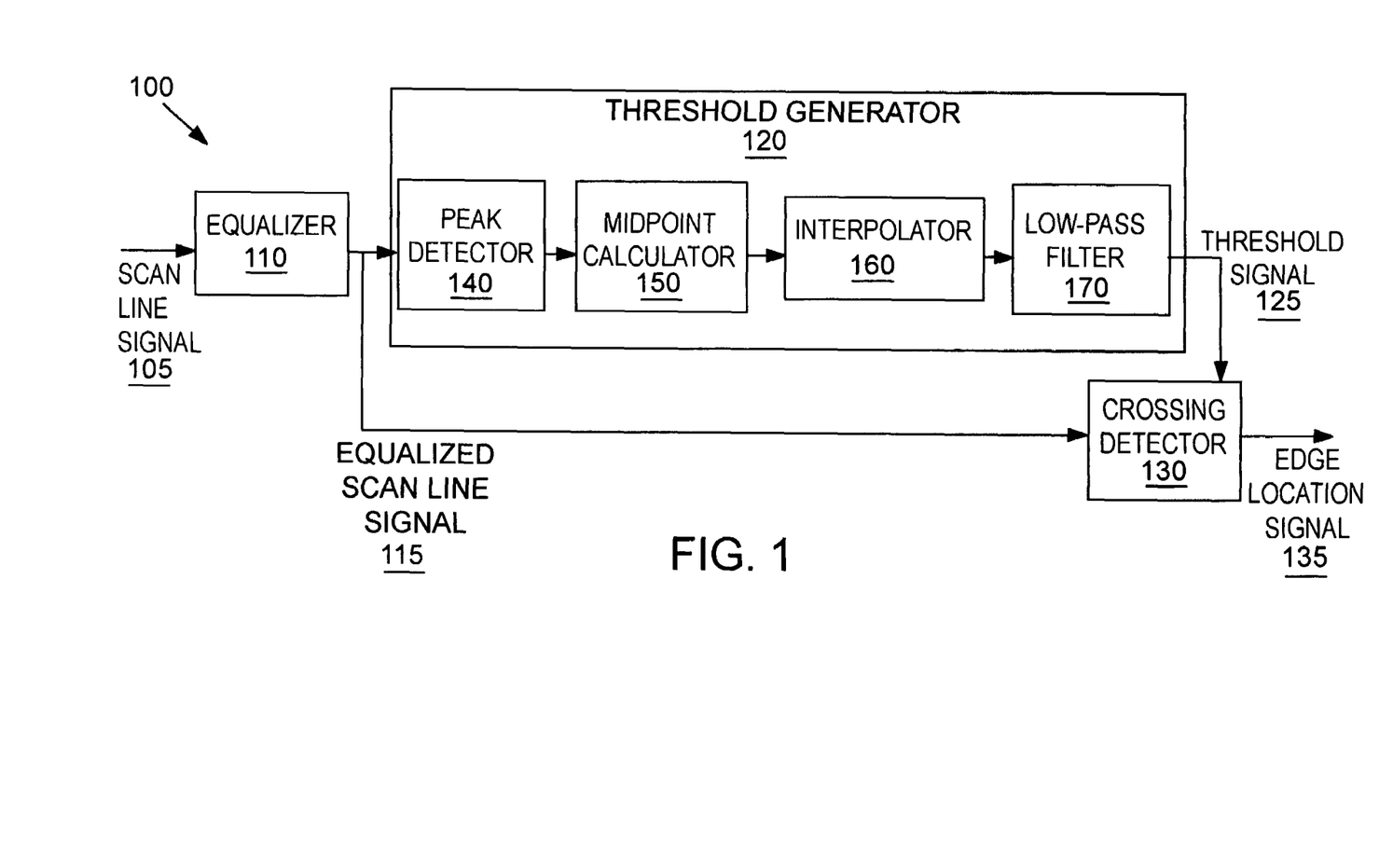
FIG. 1 is a block diagram of an edge detection system according to one embodiment.

FIG. 1 is a block diagram of an edge detection system 100, according to one embodiment. The system 100 processes a scan line signal 105 and generates an output signal indicative of the locations of edges (STV or RTV) in the optical code from which the scan line signal 105 is derived. Unlike many prior art edge detection systems, the system 100 does not compute or utilize any derivatives of the scan line signal 105. The scan line signal 105 can therefore be referred to as an undifferentiated scan line signal. The system 100 comprises three primary components: an equalizer 110, a threshold generator 120, and a crossing detector 130. The equalizer 110 performs an equalization operation on the scan line signal 105 to generate an equalized (undifferentiated) scan line signal 115. The threshold generator 120 generates a (binarizing) threshold signal 125, as explained in greater detail below. The crossing detector 130 compares the equalized scan line signal 115 to the threshold signal 125 to determine crossing points, which are optical code edge locations, as encoded in an edge location signal 135. The edge location signal 135 can be encoded, for example, as a binary signal having two states, which represent bars and spaces, respectively, the widths of each state representing bar/space widths, and the transitions between states representing edge locations. Alternatively, the edge location signal can be a list of integer or floating point numbers representing the widths of the bars and spaces, as measured by the crossing detector 130.

Figure 2:
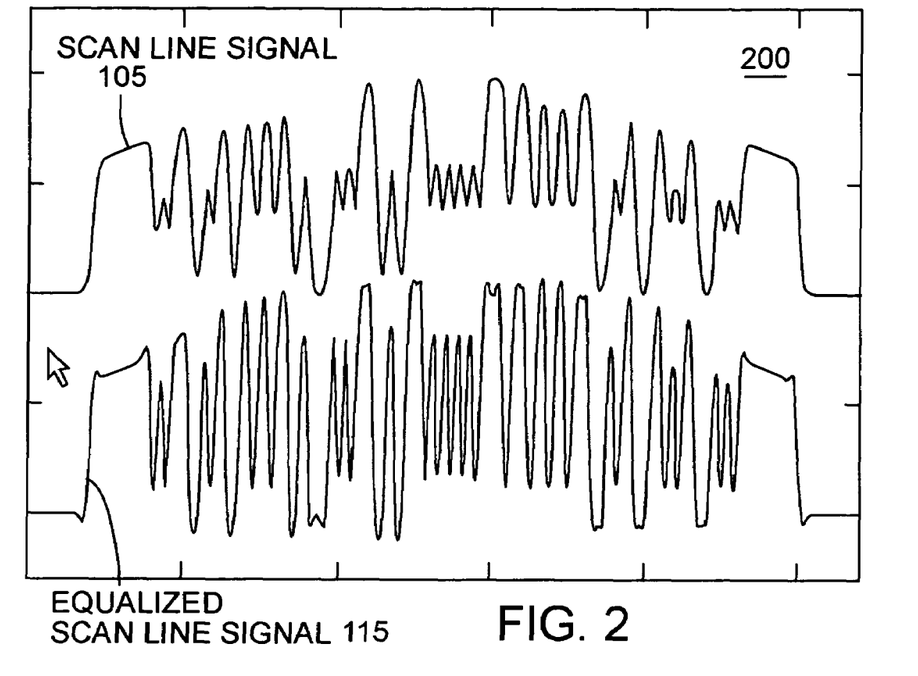
FIGS. 2 and 3 are waveform plots of signals in the edge detection system of FIG. 1.

The operation of the equalizer 120 will next be explained with reference to FIG. 2, which is a waveform plot of the scan line signal 105 and the equalized scan line signal 115. The equalizer 120 is designed to "de-blur" at least partially the scan line signal, that is, to compensate for distortions produced during the reading of an optical code. In particular, the equalizer 120 attempts to undo the effects of ISI. As can be seen in FIG. 2, the equalizer 120 increases the magnitude of small modulation peaks in the scan line signal 115. However, the equalizer 120 also can distort large magnitude peaks in the scan line signal 115, for example, producing double peaks in the equalized scan line signal 115 where a single peak is present in the scan line signal 105. By properly equalizing the undifferentiated scan line signal 105, the accuracy of the edge locations detected by the system is improved, since ISI distorts the true edge locations.

The degree of equalization is a system parameter than can preferably be adjusted. The greater the equalization, the greater the degree of tolerance in generating the threshold signal 125. Conversely, when the equalization is weak, the system 100 is more sensitive to accurate generation of the threshold signal 125. Because the threshold generator 120 is by its very nature imprecise, a fair amount of equalization is preferred, although the equalization need not be perfect.

The scan line signal 105 is preferably a digital signal having about 1000 samples, and the equalizer 120 is preferably implemented as a digital network or filter. Because ISI is typically symmetric (resulting from the typically symmetric profile of the laser beam spot on a feature of an optical code and neighboring features or from the symmetric blurring caused by a lens in an imaging system), a natural design of the equalizer 120 is a non-causal, FIR (finite impulse response) digital filter having symmetric tap weights. The non-causal behavior can be implemented by creating the equalizer output after the entire signal 105 has been received (such as from a single scan line). Alternatively, the equalizer output can be created in real time by outputting equalizer samples after waiting for M raw data samples to be captured, where M is the length of the FIR filter. As the raw data is not needed for the edge detector, the resultant delay does not affect the results. In one form, the equalizer 120 subtracts a scaled version of the second derivative of the scan line signal from the scan line signal, as the blurring caused by laser and imaging systems can be approximately modeled by a second order low pass filter. Another form of the equalizer 120 implements the following input-output equation, which is optimized to run in fixed point DSP (digital signal processing) hardware or software:

$$y[n] = \frac{1}{32767} \sum_{m=-7}^{+7} h[m]x[n-m]$$

where:
x[n]=undifferentiated scan line signal (105)
y[n]=equalized undifferentiated scan line signal (115)
h[0]=32767
h[1]=h[−1]=4803
h[2]=h[−2]=−13733
h[3]=h[−3]=1979
h[4]=h[−4]=896
h[5]=h[−5]=−1796
h[6]=h[−6]=1291
h[7]=h[−7]=−176

Given the equalized scan line signal 115 (y[n] in the preceding equation), the threshold generator 120 generates a threshold signal 125, which is a mid-range or, in some sense, a quasi-average of the equalized scan line signal 115. A preferred form of the threshold generator 120 comprises a peak detector 140, a midpoint calculator 150, an interpolator 160, and a low-pass filter 170. The operation of each of those components of the threshold generator 120 will next be described in turn.

Figure 3:
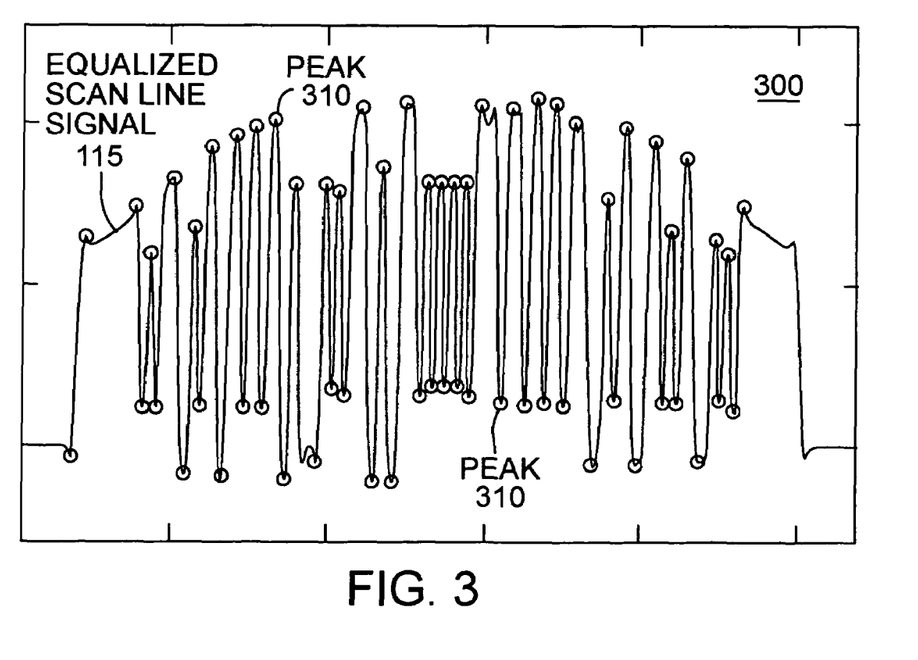

The results of the peak detector 140 are illustrated in FIG. 3, which is a waveform plot 300 of the equalized scan line signal 115 with its detected local peaks 310 denoted by circles. The peak detector 140 outputs the X (spatial distance along one dimension of an optical code) and Y (magnitude of reflected light) coordinates of each of those peaks 310. As can be seen, not every local peak is detected by the peak detector 140. Small false peaks due to noise or equalization overshoot are preferably not detected or ignored after being detected. In the peak detection algorithm described below, small false peaks are ignored via a parameter used in the algorithm.

Figure 4:
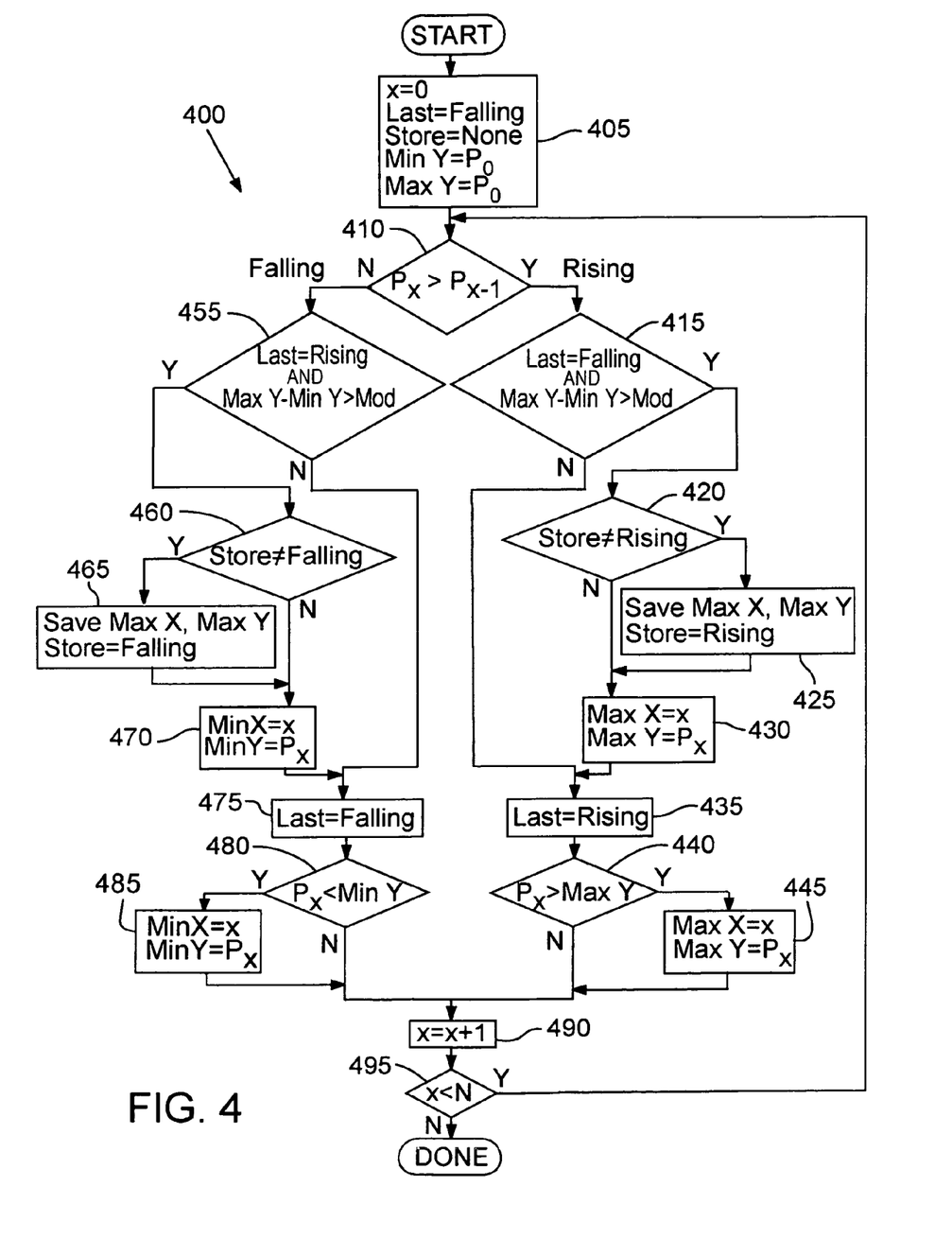
FIG. 4 is a flowchart of a peak detection method performed by the system of FIG. 1.

The peak detector 140 preferably implements a peak detection method 400, illustrated by the flowchart in FIG. 4. The peak detection method 400 operates a symmetric state machine (one side being for detection of positive peaks and the other side being for detection of negative peaks). In general terms, the method 400 proceeds point by point along the equalized scan line signal 115, whose Y values are denoted $P_0, P_1, \ldots, P_{N-1}$ in FIG. 4, and tests whether the signal is rising or falling with respect to the previous point. When the signal transitions from rising to falling or vice versa, a peak is detected, provided the peak is sufficiently distant from the previous peak. The method 400 generates the X and Y coordinates of each detected peak.

More specifically, the method 400 begins by initializing (405) a number of internal variables, including an X index (x), a variable (last) indicating the rising/falling state of the previous point, a flag (store) used to regulate when a peak's coordinates are stored as output values, and variables MinY and MaxY, which are used to keep track of the minimum and maximum Y values of the signal during a rise or a fall. The method 400 iterates from point to point along the equalized scan line signal 115. During each iteration, the method 400 compares (410) the current value of the signal ($P_x$) to the previous value ($P_{x-1}$). If $P_x > P_{x-1}$, then the signal is rising; otherwise, it is falling. In the case of a rising signal, the method 400 tests (415) whether the signal was falling before the current point (last=falling). If so, the previous point represents a local minimum or negative peak. The method 400 further tests (415) whether the local minimum peak is a sufficient distance from the last local maximum peak (MaxY−MinY>Mod). The parameter Mod controls how large that separation must be to qualify a peak. In other words, the parameter Mod represents a minimum modulation depth to qualify local peaks, so that the peak detector can ignore small peaks corresponding to noise or equalizer overshoot.

If the testing step 415 indicates a minimum or negative peak having sufficient modulation depth, then the method 400 checks (420) whether the current peak coordinates should be stored and, if so, stores (425) them. The variable "store" is used to keep track of peak storage so that only one pair of coordinates is stored for each peak. Whether the coordinates of the peak are stored or not, the method 400 updates (430) MaxX and MaxY variables to equal the coordinates of the current point in the signal.

The method 400 next updates (435) the "last" flag to reflect the fact that the signal is rising. The method 400 also tests (440) whether $P_x$>MaxY. If so, the method 400 updates (445) the MaxX and MaxY variables to equal the coordinates of the current point in the signal. The testing step 440 and the updating step 445 cause MaxX and MaxY to follow the rising of the waveform and stop at the local maximum.

If the result of the comparing step 410 is that the signal is falling, rather than rising, then the method 400 performs steps 455-485, which are symmetric to steps 415-445, respectively, and therefore not described in detail. In either case, the method 400 increments (490) the X index and tests (495) whether the last point in the signal has been examined or additional iterations are required. When the method 400 terminates, it has produced a set of coordinates of qualified peaks in the equalized undifferentiated scan line signal 115. Those coordinates are preferably stored as two arrays—X values and Y values—with corresponding indices such that the stored peak coordinates are $\{(PeakX[n], PeakY[n])\}_{n=0 \ldots I-1}$ where I is the number of peaks.

Figure 5:
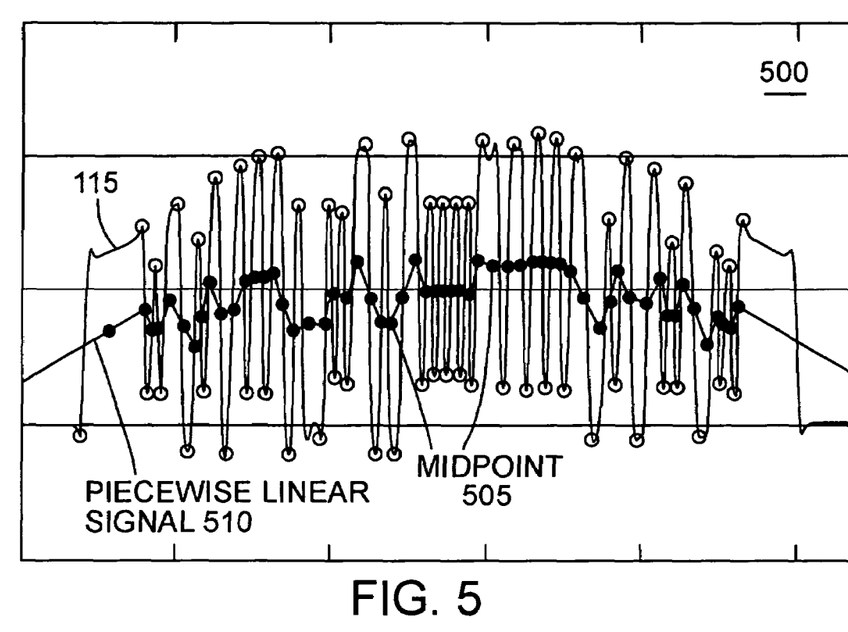
FIGS. 5 and 6 are waveform plots of signals in the edge detection system of FIG. 1.

Given the coordinates of the peaks 310, the midpoint calculator 150 calculates midpoints 505 between successive peaks 310 in both the X and Y directions as follows:

$$MidX[n]=(PeakX[n]+PeakX[n+1])/2$$

$$MidY[n]=(PeakY[n]+PeakY[n+1])/2$$

$$n=0 \ldots I-2.$$

Next, the interpolator 160 constructs a curve through and connecting each successive midpoint. Preferably, the interpolation is linear such that line segments connect each successive midpoint 505, so as to result in a piecewise linear signal 510 that passes through each midpoint 505, as shown in the waveform plot 500 depicted in FIG. 5. The signal 510 preferably has an output value for each data point in the equalizer output signal, so the waveforms are of the same length. Each line segment can be constructed using, for example, a Bresenham line drawing algorithm so as to efficiently and most accurately determine which of the discrete quantized X and Y values between successive midpoints 505 should be included as part of the adjoining line segment. Other techniques for interpolation, such as those based on cubic splines, for example, can be used in place of linear interpolation.

Figure 6:
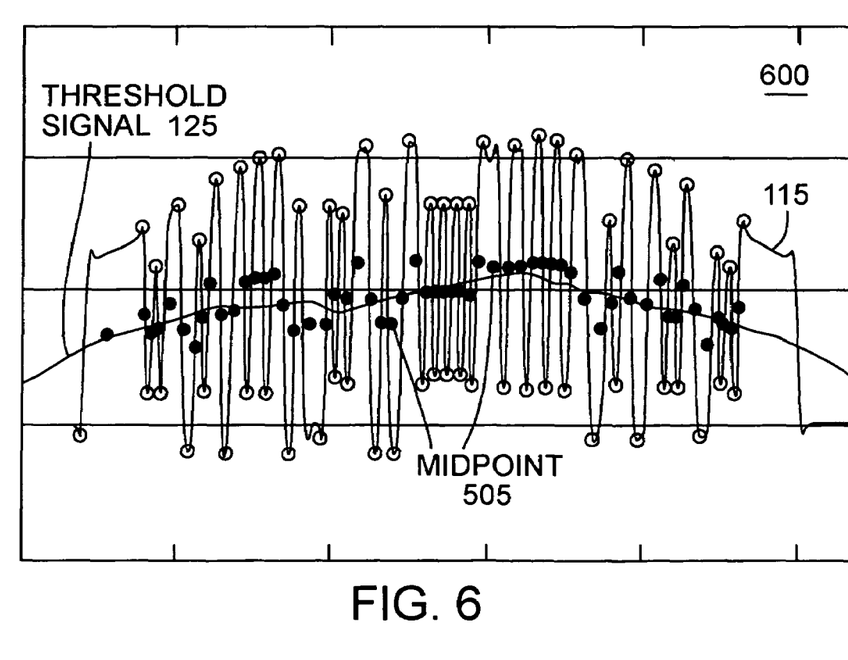

The final step in generating the threshold signal 125 is to perform low-pass filtering on the piecewise linear signal 510. The low-pass filtering operation is desirable because it smooths out the jaggedness of the piecewise linear signal 510. An ideal threshold signal is smooth and should not change abruptly over a small distance in the X direction (e.g., along the direction of the bar code). Furthermore, in the presence of ISI, the correct location of the threshold is a complicated function of the neighboring element widths and the degree of ISI, not a simple midpoint or average. Although numerous low-pass filtering algorithms can be utilized, an FIR filter implementing a simple moving average operation is preferred for ease of implementation. In one preferred version of the filter, the moving average is taken over a number of points so as to cover several minimum element widths. FIG. 6 shows a waveform plot 600 of the threshold signal 125 that results from such moving-average filtering of the piecewise linear signal 510.

Figure 7:
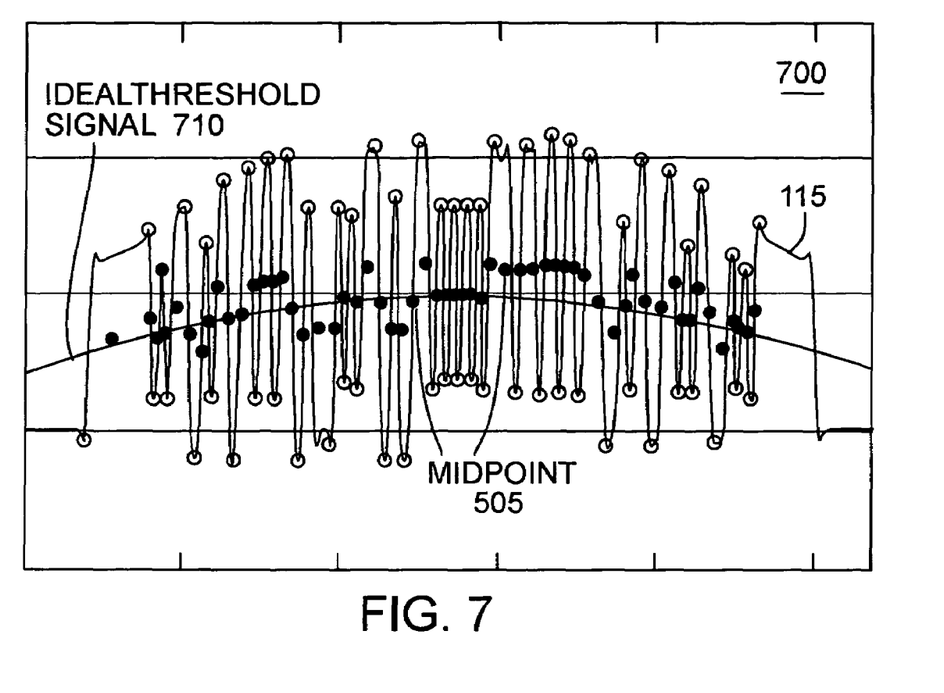
FIG. 7 is a waveform plot of an ideal threshold signal in the edge detection system of FIG. 1.

FIG. 7 is a waveform plot 700 of an ideal threshold signal 710. The equalized undifferentiated signal 115 simulates the effects of imaging or laser collection vignetting, the variation of signal versus position. As can be seen, the ideal threshold signal 710 is a smooth curve that is generally concave downwardly, due to the change in signal level due to vignetting. The downward tails of the ideal threshold signal 710 at its ends are attributable to the black margin space on either side of the optical code. Locations of the midpoints 505 are shown in FIG. 7 for comparison purposes. It can be seen that midpoints 505 that divide bars and spaces that are both wide (so called uncrowded edges) closely match the ideal threshold amplitude. In addition, midpoints 505 that divide bars and spaces that are both narrow (so called doubly crowded edges) also closely match the ideal threshold amplitude. However, midpoints 505 that divide bars and spaces of unequal widths (so called singly crowded edges) are not near the ideal threshold in amplitude. The smoothed threshold signal 125 attempts to match the ideal threshold signal 710 by smoothing out the errors caused by singly crowded edges. The threshold signal 125 is an approximation to the ideal threshold signal 710, constructed without the benefit of knowing ex ante what an ideal threshold should be, and also constrained by limitations on the complexity of the mathematical operations that can be performed during its construction.

Given the threshold signal 125 and the equalized scan line signal 115, the crossing detector 130 determines the points at which those two signals intersect one another. The crossing detector 130 may be as simple as a comparator, which compares the equalized scan line signal 115 to the threshold signal 125 and produces a high state in its output when the equalized scan line signal 115 exceeds the threshold signal 125. To obtain subpixel accuracy, however, the two signals can be interpolated between successive pixels on either side of the crossing point, and the crossing point can be accurately determined by computing the intersection of those two line segments. A linear interpolation of both signals in the crossing region requires only four pixel values: the threshold values before and after the crossing and the equalized values before and after the crossing. Higher order interpolation, such as cubic spline interpolation, may be used but is typically not required. The resulting output of the crossing detector 130 is a list of fractional X values, which correspond to edge locations in the binary optical code. That list is encoded in the edge location signal 135, which is output from the crossing detector 130, either as a waveform or as an array of integer or floating point numbers.

Figure 8:
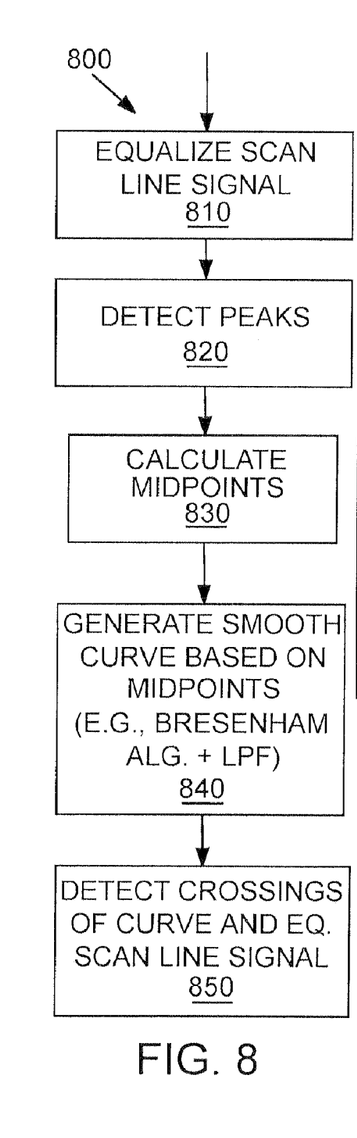
FIG. 8 is a flowchart of a method according to one embodiment.

FIG. 8 is a flowchart of a method 800 according to one embodiment. The system 100 (illustrated in FIG. 1) is one example of a system performing one version of the method 800. The method 800 begins by equalizing (810) a scan line signal, such as the scan line signal 105. Next, the method 800 detects (820) peaks in the equalized scan line signal (e.g., the equalized scan line signal 115). Based upon those peaks, the method 800 calculates (830) midpoints between successive detected peaks. Then, the method 800 generates (840) a smooth curve based on the calculated midpoints. That smooth curve is a threshold signal, and the steps 820-840 together constitute a step of generating a threshold signal based on the equalized scan line signal. Finally, the method 800 detects (850) crossings of the equalized scan line signal and the generated curve.

The curve generating step 840 is a generalization of the operations performed by the interpolator 160 and the low-pass filter 170 in the system 100. The interpolator 160 and the low-pass filter 170 together generate a signal on the basis of the midpoints. That signal is smooth and in some sense "matches" or "fits" the midpoints. Techniques other than interpolation and low-pass-filtering can achieve the same objective. For example, regression using polynomial or other data models can be utilized to obtain a curve that best fits the midpoints according to some criteria (e.g., minimizing the sum of the errors squared). A low order polynomial model is preferred, as the vignetting is closely modeled by a parabola, and lighting variations within the barcode can be modeled by a fourth order polynomial.

The steps of the method 800 are typically performed in a batch mode after the entirety of the scan line signal (i.e., all N data points) has been acquired. Furthermore, each step is typically completed before the next step is begun. However, those constraints can be relaxed. In the preferred version of the method 800, the equalization step 800 is a non-causal operation with memory. As a result, the equalization step 800 also has associated with it some latency. Other versions of the equalization step may not have that latency. Moreover, the remaining steps also have associated with them some latency, as it is necessary to examine some neighborhood around a signal point before a peak can be detected, or wait for two successive peaks to calculate their midpoint, or examine some collection of points to generate a curve based on those points. Within those latency constraints, however, the steps of the method 800 can be performed concurrently in a pipeline fashion. Real time operation is therefore possible, with an advantage of a reduced memory requirement.

Figure 9:
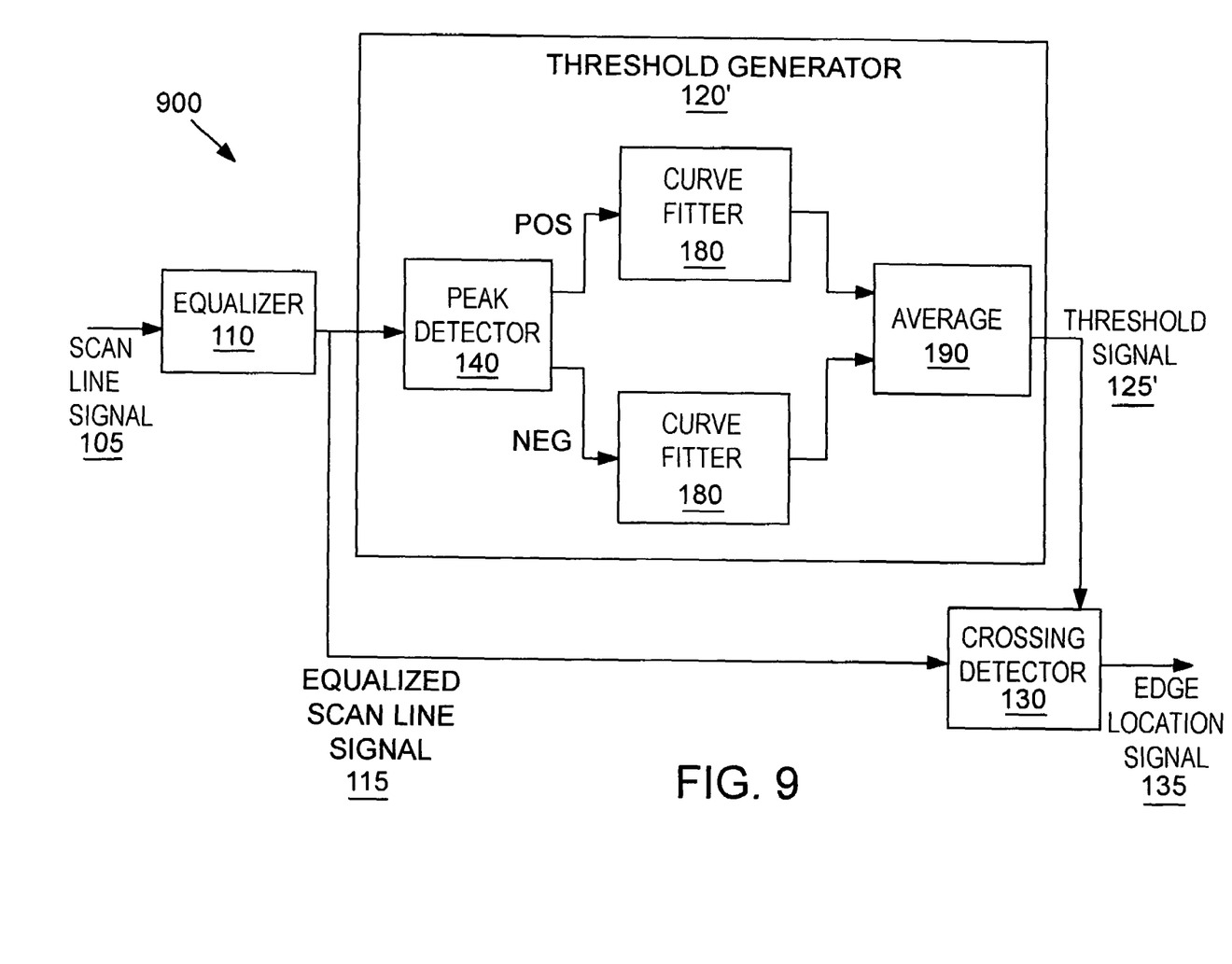
FIG. 9 is a block diagram of an edge detection system according to another embodiment.

FIG. 9 is a block diagram of an edge detection system 900 according to another embodiment. The system 900 is like the system 100 (FIG. 1) except for the threshold generator 120'. Like the threshold generator 120 in the system 100, the threshold generator 120' comprises a peak detector 140. However, the outputs of this peak detector 140 are segregated as either positive or negative peaks, which are typically alternating, except in the cases where noise peaks or equalization overshoot are ignored by the peak detector. Each set of peaks is processed by a respective curve fitter 180, which generates respective top and bottom curves. These curves together approximate the envelope of the equalized scan line signal 115. The curve fitters 180 may comprise an interpolator and a low-pass filter, or a regression model, or any other suitable methods or means for fitting a curve based on discrete data points. The respective outputs of the curve fitters 180 are connected as inputs to an averager 190, which computes a pointwise average of the two curves, that average being the threshold signal 125'. The crossing detector 130 in the system 900 can be the same as in the system 100.

Figure 10:
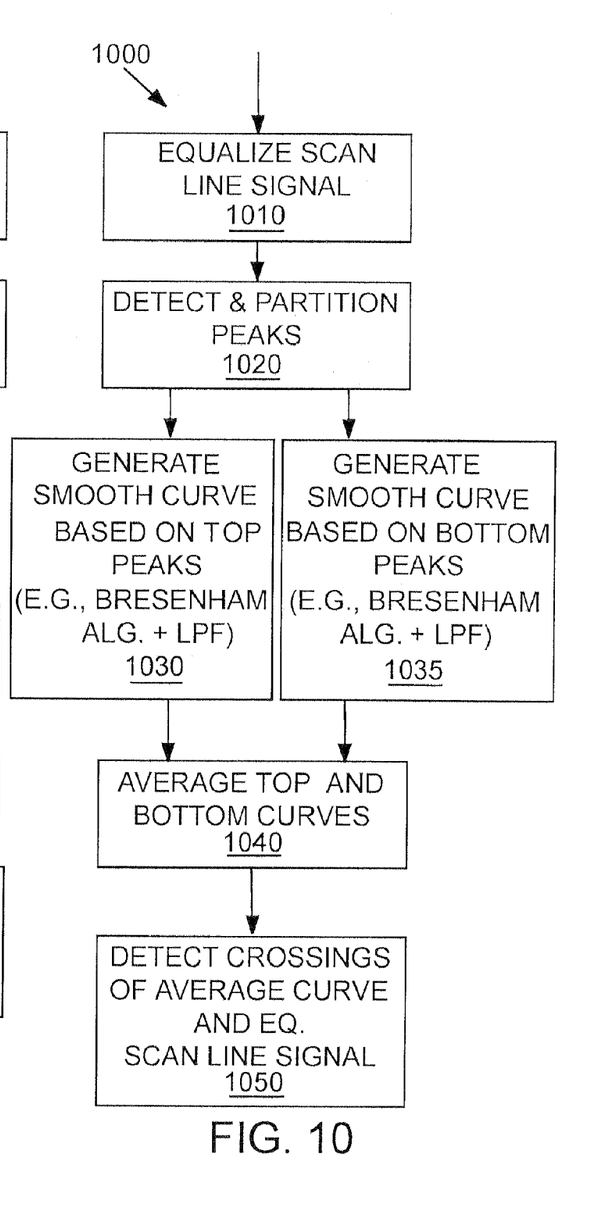
FIG. 10 is a flowchart of a method according to another embodiment.

FIG. 10 is a flowchart of a method 1000 according to another embodiment. The method 1000, like the system 900, is based on the notion of fitting curves to the equalized scan line signal's top and the bottom peaks, rather than the midpoints between those peaks. Like the method 800, the method 1000 begins by equalizing (1010) a scan line signal. The method 1000 next detects (1020) peaks in that signal and partitions the detected peaks into positive and negative ones. The method 1000 independently generates (1030,1035) smooth curves based on the positive or top peaks and the negative or bottom peaks respectively. Then, the method 1000 averages (1040) the top and bottom curves thus generated. Finally, the method 1000 detects (1050) crossings of the average curve and equalized scan line signal.

Figure 11:
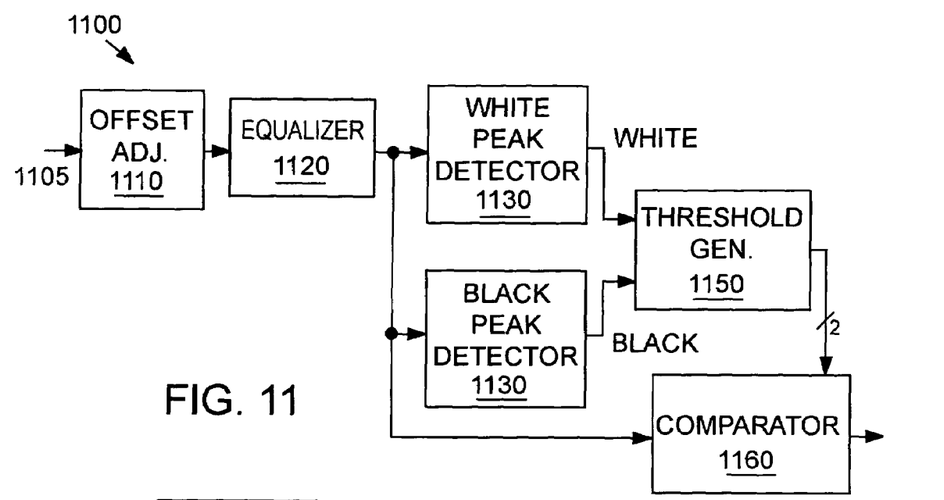
FIGS. 11 and 12 are block diagrams of edge detection systems according to still other embodiments.

The methods 800 and 1000 are preferably implemented in software and/or digital hardware, and the systems 100 and 900 are preferably software and/or digital hardware systems. However, the system 900 and the method 1000 can also be conveniently implemented in analog hardware. FIG. 11 is a block diagram of such an analog edge detection system 1100.

The system 1100 comprises an offset adjuster 1110, the input to which is a pre-amplified ("preamp") analog scan line signal 1105. The offset adjuster 1100 creates an absolute reflectance preamp signal, in which the minimum value of the signal implies absolute black reflectance. The offset adjuster 1100 could be a synchronous detection block, in the case of a modulated laser system, or a slow negative peak detector (like the global black peak detector 1230 described below with reference to FIG. 12). If the preamp signal 1105 has periodic regions that are absolutely black (such as in a facet-wheel-based barcode scanner, in which the regions of scan between the pattern mirror have very little returned light, or in a dithering scan system, wherein the scan line can hit a black region inside the scanner at each end of scan), then a negative peak detector with a long time constant can detect that black value and subtract it from the preamp signal 1105, creating an output that is based on absolute reflectance. In the case of a high contrast imaging system, the offset adjuster 110 could provide merely a DC offset correction. Some imagers have a certain number of "black pixels" that are shielded from light in order to have this offset corrected.

The output of the offset adjust 1110 is input to an equalizer 1120, which is placed before two peak detectors—a white peak detector 1130 and a black peak detector 1140. Each peak detector 1130 or 1140 can be implemented, for example, using a diode-capacitor circuit. The white peak detector 1130 generates an output signal that approximately tracks the top envelope of the equalized, offset-adjusted, pre-amplified scan line signal. Similarly, the black peak detector 1140 generates an output signal that approximately tracks the bottom envelope of the equalized, offset-adjusted, pre-amplified scan line signal.

The outputs of the peak detectors 1130 and 1140 are input to a threshold generator 1150, which generates two thresholds. First, the threshold generator 1150 generates a binarizing threshold "BinarizingThreshold" by the following averaging operation: BinarizingThreshold=½ (Black+White), where "Black" and "White" denote the outputs of the black and white peak detectors 1130 and 1140, respectively. The binarizing threshold provides a mid reflectance (gray) threshold to binarize the output of the equalizer 1120. Second, the threshold generator 1150 generates a print contrast threshold "PrintContrastThreshold" as follows: PrintContrastThreshold=(1−PCR)* White, where PCR is a minimum print contrast ratio. The resultant threshold is down from the white level by a percentage equal to PCR.

The comparator 1160 produces a signal indicating the bar edge locations as follows: Output 0 or low if both of the following conditions are true: EqualizerOut<BinarizingThreshold and EqualizerOut<PrintContrastThreshold. Otherwise, output 1 or high. In this way, the output signal is low if the equalizer output is below the binarizing threshold and if the equalizer value is below the print contrast threshold, implying that the signal is black enough at that point to really be a bar. The output of the comparator 1160 is a signal in which a 0 or low state represents a bar, a 1 or high state represents a space, and state transitions represent RTV or STV edges.

An alternative embodiment does not include the offset adjuster 1110, formulates a different threshold, and utilizes a different comparator. This embodiment is useful when an absolute reflectance preamp signal is impossible or impractical to generate. Such is the case in low contrast CCD optics systems, such as a multi-zone lens imager. Such is also the case in laser barcode scanners that do not use modulation, as ambient light can be a large fraction of the total received signal. In these cases, the print contrast threshold is replaced with a constant threshold (called the modulation threshold) that is compared to the total modulation depth of the signal, which is calculated as the positive (white) peak detector output minus the negative (black) peak detector output. In the white space (margin) regions and in regions where there is no object at all (e.g., when the scanner is looking out into space), the positive and negative peak detectors will be nearly the same value, implying no modulation depth. In this case, the modulation depth is less than the modulation threshold, and no transitions are allowed. If the scanner is staring into space and then scans across the beginning (margin) of a barcode, the output of the white peak detector 1130 will rise, causing the modulation depth to increase over the modulation threshold, thereby allowing output transitions. In a similar manner, if a large amount of white space (margin) occurs before the barcode, the signal will have no modulation, but when the beginning of the barcode (i.e., first bar) is seen, the output of the black peak detector 1140 will fall, causing the modulation depth to increase over the modulation threshold, thereby allowing output transitions. In this way, the signal processing circuit prevents spurious output transitions even though the preamp is not referenced to absolute reflectance.

More particularly, in this alternative embodiment, the BinarizingThreshold is computed in exactly the same way as described above. The other threshold, however, is different. That other threshold is a modulation depth threshold, denoted ModulationDepthThreshold, which is a constant larger than the noise floor of the system. The comparator 1160 generates a 0 or low output when both of the following conditions are true: EqualizerOut<BinarizingThreshold and (White−Black>ModulationDepthThreshold); otherwise, a 1 or high output is generated. This sets the final output low if the equalizer output is below the binarizing threshold and if the modulation (as measured by White−Black) is greater than the modulation depth threshold, implying that the white to black levels are large enough to really be a bar.

Figure 12:
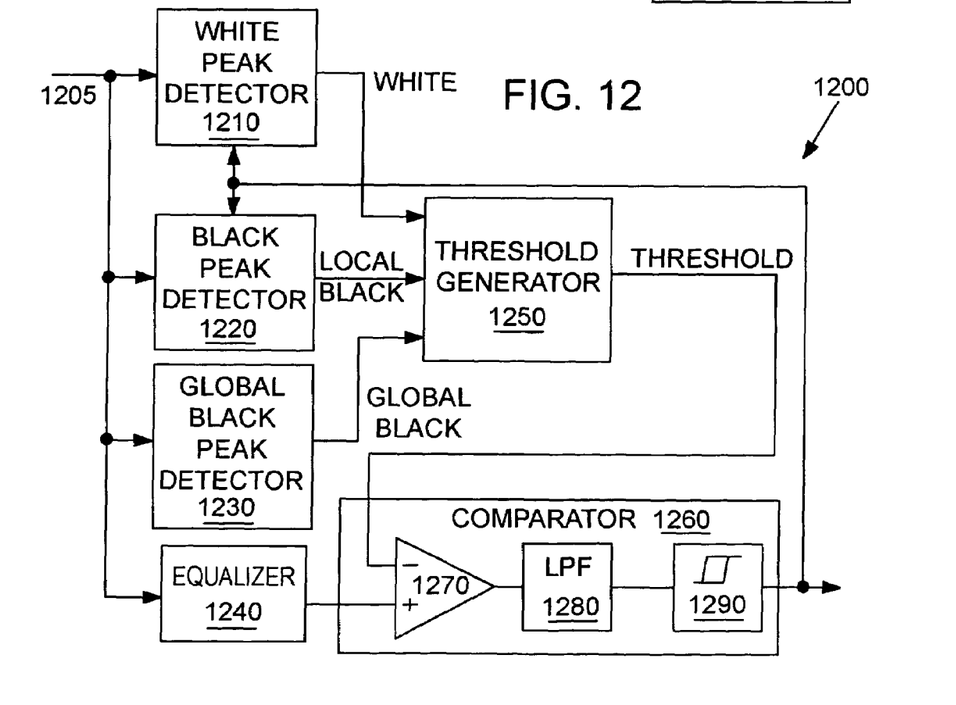

FIG. 12 is a block diagram of another analog edge detection system 1200. A pre-amplified analog scan line signal 1205 is input to a white peak detector 1210, a black peak detector 1220, a global black peak detector 1230, and an equalizer 1240 in the analog edge detection system 1200. The white peak detector 1210 and the black peak detector 1220 have relatively rapid decay times to allow them to follow local white and black levels. Their outputs are denoted "White" and "LocalBlack," respectively. In contrast, the global black peak detector 1230 has a relatively long decay time (like the black peak detector 1140 in FIG. 11) so as to track the global black level in the pre-amplified scan line signal. The output of the global black peak detector 1230 is denoted "GlobalBlack." The equalizer 1240 can be the same as the equalizer 1120 in the edge detection system 1100.

A threshold generator 1250 generates a single threshold signal "Threshold" using the peak levels detected by the white peak detector 1210, the black peak detector 1220, and the global peak detector 1230. In order to prevent noise from being misinterpreted as black or white peaks, a minimum black level is generated using the detected white signal level and the detected global black signal level. The minimum black level, denoted $V_L$, is preferably set at a suitable level which corresponds to the lowest print contrast that is to be detected. For example, the minimum black level $V_L$ may be set at a contrast level corresponding to roughly a 50% contrast level, although other contrast levels may also be used depending upon the level of performance that is desired. For the example of a 50% contrast level, the minimum black level $V_L$ would thus be generated according to the following relationship:

$$V_L = \tfrac{1}{2}(\text{White} - \text{Global Black}).$$

Although in some embodiments the minimum black level $V_L$ may be used as the black level for thresholding, it is preferred that the black level used for thresholding be selected as the lesser of the minimum black level $V_L$ and the local black signal detected by the black peak detector 1220, (i.e., BlackLevel=min ($V_L$, LocalBlack)), thereby allowing high contrast targets to lower the black level used for thresholding, for increased accuracy. The Threshold signal is preferably set to the midpoint of the pre-amplified photodetector signal 202, by determining the average of the White signal and the black level used for thresholding, i.e., Threshold=½(White+BlackLevel). The Threshold signal may therefore, in one sense, be referred to as a binarizing threshold signal. Advantageously, the Threshold signal is prevented from approaching too close to the White signal level, due to the action of the BlackLevel signal, thereby avoiding the detection of noise that might otherwise be detected if the Threshold signal did not have a sufficient margin from the White signal level.

The comparator 1260 operates by comparing the equalized pre-amplified scan line signal to the Threshold signal. In the simplest case, when the former exceeds the latter, the output of the comparator 1260 is 1 or high; otherwise, it is 0 or low. Preferably, the comparator 1260 is a noise-tolerant comparator comprising a simple comparator 1270, a low-pass filter 1280, and a hysteresis circuit 1290 connected in series. The low pass filter 1280 attenuates the effect of high frequency switching of the comparator 240 caused by, e.g., noise in the equalized pre-amplified scan line signal. The hysteresis circuit 1290 essentially comprises a comparator with a threshold that varies according to its output state. A primary purpose of the hysteresis circuit 1290 is to reduce the effects of noise, by adjusting its switching threshold slightly upwards (after transitioning low) or slightly downwards (after transitioning high) each time it switches states between high and low states. By changing its threshold based upon its output state, the hysteresis circuit 1290 reduces the likelihood that sudden, rapid changes in its input signal, such as those indicative of noise, will be carried through to its output. The use of the low pass filter 1280 and the subsequent hysteresis circuit 1290 avoids thresholding errors, which would occur if the comparator 1270 were designed directly with hysteresis. The comparator 1270 generates a binary signal that experiences chatter (high frequency transitioning) when crossing the threshold. The low pass filter 1280 smooths this output, creating a clean representation of exactly when the equalizer signal 1240 crosses the threshold, when used in conjunction with the hysteresis circuit 1290.

The edge detection system 1200 preferably includes a feedback connection from the output of the comparator 1260 to the white peak detector 1210 and the black peak detector 1220. If the output of the comparator 1260 stays low for a period longer than the widest black element, then the white peak detector 1210 is reset (to black). This reset allows the system to adjust to small signals, such as would be seen in a far field. Similarly, if the output of the comparator 1260 stays high for a period longer than the widest white element, then the black peak detector 1220 is reset (to the maximum black level, toward white). That reset allows the peak detector to be ready to see low contrast labels.

One example of the analog equalizer 1120 or 1240 in the edge detection systems 1100 or 1200 of FIG. 11 or 12, respectively, will next be described. The inventor has observed that typical laser spots generated in bar code scanning have either Gaussian profiles (when generated from unapertured beams, typical of laser tubes, for instance) or Airy disc profiles (when generated from apertured beams, typical of laser diodes, for instance). Spot shapes from imaging-based systems (which generally use CCD devices or other solid state circuitry for image capture) are typically Airy discs as well. The frequency response for both Gaussian and Airy disc profiles, whether generated from a moving-spot laser scanning or imaging devices, is similar. Thus, equalization techniques as described herein may apply to both moving-spot laser scanners or imaging devices.

In an analog embodiment, a continuous time filter can be used to approximately equalize the input response. For a continuous time filter, the equalization function can be approximated mathematically using a Taylor's series expansion. Consequently, the continuous time filter should more closely approximate the desired function as the order of the filter is increased. Because the spot shape of the laser spot or imaging device is symmetric, the Taylor's series expansion is an even function. From a practical standpoint, continuous time filters are generally limited to around fourth order. Therefore, an equalizer based upon a continuous time filter is potentially constructed using a zero-th order, second order, or fourth order expansion. A zero-th order equalizer is essentially an all-pass filter that provides no de-blurring, and therefore is not a suitable option. A second order equalizer adds a controlled amount of a second order high pass function to the pre-amplified signal. A fourth order equalizer adds a controlled amount of second order and fourth order high pass functions. Equalizers generally need to be band limited in order to prevent excessive noise enhancement. This requirement also sets a maximum gain for the equalizer function. When viewed in the context of the band limit restrictions, a second order equalizer is created by adding a controlled amount of the band limited second derivative of the pre-amplified signal. A fourth order equalizer, on the other hand, adds a controlled amount of the band limited second and fourth derivatives of the pre-amplified signal. Based upon the results of simulations, the additional complexity of a fourth order equalizer would generally not be justified for whatever improvement in performance is obtained over a second order equalizer, although in some atypical environments the tradeoff may be desirable.

A preferred transfer function for a second order equalizer based upon a continuous time filter is as follows:

$$H(s) := \frac{1 - G\left(\frac{s}{\omega_0}\right)^2}{\left[\left(\frac{s}{\omega_0}\right)^2 + 1.73\frac{s}{\omega_0} + 1\right]^2}$$

The 1.73 in the denominator sets the bandlimiting cutoff to a Bessel filter response, which has low overshoot. The parameter $\omega_0$ sets the cutoff frequency for bandlimiting, which is typically set to the frequency of a sequence of narrow bars and spaces at the far field distance of the scanner. The parameter G determines the amount of second derivative equalization, which can be determined experimentally or by modeling to be the best compromise over the desired depth of field, providing sufficient equalization of small barcode elements, yet not over-equalizing too much in areas where the laser or imaging spot size is small.

The methods and systems illustrated and described herein can exist in a variety of forms both active and inactive. For example, they can exist partially or wholly as one or more software programs comprised of program instructions in source code, object code, executable code or other formats. Any of the above can be embodied on a computer-readable medium, which include storage devices in compressed or uncompressed form. Exemplary computer-readable storage devices include conventional computer system RAM (random access memory), ROM (read only memory), EPROM (erasable, programmable ROM), EEPROM (electrically erasable, programmable ROM), flash memory and magnetic or optical disks or tapes.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims (and their equivalents) in which all terms are to be understood in their broadest reasonable sense unless otherwise indicated.

The invention claimed is:

1. A method for constructing a threshold signal to be used for comparison with an equalized undifferentiated scan line signal imperfectly representing a binary optical code, the method comprising:
   detecting peaks in the equalized undifferentiated scan line signal;
   determining midpoints between successive detected peaks;
   generating a smooth signal based on the midpoints, the generated signal being the threshold signal.

2. The method of claim 1, wherein generating the smooth signal comprises:
   interpolating between successive midpoints so as to result in a signal passing through the midpoints; and
   low-pass filtering the signal passing through the midpoints so as to result in a filtered signal, the filtered signal being the threshold signal.

3. The method of claim 2, wherein interpolating between successive midpoints comprises:
   linearly interpolating between successive midpoints.

4. The method of claim 3, wherein interpolating comprises:
   performing linear interpolation using a Bresenham algorithm.

5. The method of claim 2, wherein low-pass filtering comprises:
   calculating a moving average of the signal.

6. The method of claim 2, wherein low-pass filtering comprises:
   using a finite impulse response filter.

7. The method of claim 1, wherein generating the smooth signal comprises:
   performing regression using the midpoints so as to generate a signal curve that fits the midpoints according to a criterion.

8. The method of claim 7, wherein the regression is based on a polynomial model.

9. The method of claim 7, wherein the criterion is minimization of the sum of squared regression errors.

10. The method of claim 1, wherein the midpoints are 50% midpoints in both value and location.

11. The method of claim 1, wherein the optical code is a bar code having relatively light areas and the relatively dark areas.

12. The method of claim 1, further comprising:
equalizing an undifferentiated scan line signal so as to generate the equalized undifferentiated scan line signal.

13. The method of claim 1, further comprising:
comparing the threshold signal to the equalized undifferentiated scan line signal;
determining locations at which the equalized undifferentiated scan line signal crosses the threshold signal; and
indicating the determined locations as locations of edges in the binary optical pattern.

14. The method of claim 13, wherein determining locations comprises:
interpolating between crossing successive respective samples of the equalized undifferentiated scan line signal and the threshold signal to determine precisely locations at which they cross one another.

15. A computer-readable medium on which are embedded program instructions performing the method of claim 1.

16. A system for constructing a threshold signal to be used for comparison with an equalized undifferentiated scan line signal imperfectly representing a binary optical code, the system comprising:
a means for detecting peaks in the equalized undifferentiated scan line signal;
a means for detecting midpoints between successive detected peaks;
a means for generating a smooth signal based on the midpoints, the generated signal being the threshold signal.

17. A threshold signal generator comprising:
a peak detector having an input accepting an equalized scan line signal, the peak detector generating coordinates of local peaks in the scan line signal;
a midpoint calculator having an input accepting the coordinates of the local peaks from the peak detector in their order of occurrence, the midpoint calculator generating coordinates of midpoints between successive peaks; and
a signal curve generator having an input accepting the coordinates of the midpoints from the midpoint calculator, the signal generator generating a signal that approximately fits the midpoints.

18. The threshold signal generator of claim 17, wherein the signal curve generator comprises:
an interpolator having an input accepting the coordinates of the midpoints from the midpoint calculator, the interpolator generating a signal curve passing through the midpoints; and
a low-pass filter having an input accepting the signal curve generated by the interpolator, the low-pass filter producing the threshold signal as an output.

19. The threshold signal generator of claim 17, wherein the signal curve generator comprises:
a regression model that fits the midpoints to a parameterized signal model according to an optimum fit criterion.

20. The threshold signal generator of claim 19, wherein the regression model has the form of a polynomial.

21. A method for constructing a threshold signal to be used for comparison with an equalized undifferentiated scan line signal imperfectly representing a binary optical code, the method comprising:
detecting local peaks in an equalized undifferentiated scan line signal, wherein the peaks are either positive or negative peaks;
generating a top curve based on the positive local peaks;
generating a bottom curve based on the negative local peaks; and
creating a middle curve that is a pointwise average of the top curve and the bottom curve, wherein the middle curve corresponds to the threshold signal.

22. The method of claim 21, wherein generating the top curve comprises:
interpolating between successive positive local peaks so as to result in a signal passing through the positive local peaks; and
low-pass filtering the signal passing through the positive local peaks so as to result in a filtered signal, the filtered signal being the top curve; and
wherein generating the bottom curve comprises:
interpolating between successive negative local peaks so as to result in a signal passing through the negative local peaks; and
low-pass filtering the signal passing through the negative local peaks so as to result in the bottom curve.

23. The method of claim 22, wherein interpolating comprises:
linearly interpolating between successive like-polarity local peaks.

24. The method of claim 23, wherein interpolating comprises:
using a Bresenham algorithm to perform linear interpolation.

25. The method of claim 22, wherein low-pass filtering comprises:
calculating a moving average of the signal passing through the like-polarity peaks.

26. The method of claim 22, wherein low-pass filtering comprises:
using finite impulse response filters.

27. The method of claim 21, wherein generating the top curve comprises:
performing regression using the positive local peaks so as to generate a curve that fits the positive local peaks according to a criterion.

28. The method of claim 21, wherein generating the bottom curve comprises:
performing regression using the negative local peaks so as to generate a curve that fits the negative local peaks according to a criterion.

29. The method of claim 21, further comprising:
equalizing an undifferentiated scan line signal so as to generate the equalized undifferentiated scan line signal.

30. The method of claim 21, further comprising:
comparing the threshold signal to the equalized undifferentiated scan line signal;
determining locations at which the equalized undifferentiated scan line signal crosses the threshold signal; and
indicating the determined locations as locations of edges in the binary optical pattern.

31. The method of claim 30, wherein the determining locations comprises:
interpolating between crossing successive respective samples of the equalized undifferentiated scan line signal and the threshold signal to determine precisely locations at which they cross one another.

32. A computer-readable medium on which are embedded program instructions performing the method of claim 21.

33. A threshold signal generator comprising:
a peak detector having an input accepting an equalized scan line signal, the peak detector generating coordinates of local peaks in the scan line signal, wherein the local peaks are either positive or negative local peaks;

a first signal curve generator having an input accepting the coordinates of the positive local peaks from the peak detector, the first signal curve generator generating a first signal curve that approximately fits the positive local peaks;

a second signal curve generator having an input accepting the coordinates of the negative local peaks from the peak detector, the second signal generator generating a second signal curve that approximately fits the negative local peaks; and an averager having inputs accepting the first signal curve and the second signal curve and generating an output that is a pointwise average of the first and second signal curves, wherein the output is the threshold signal.

34. The threshold signal generator of claim 33, wherein each signal curve generator comprises:

an interpolator having an input accepting the coordinates of like-polarity peaks from the peak detector, the interpolator generating a signal curve passing through the like-polarity peaks; and a low-pass filter having an input accepting the signal curve generated by the interpolator, the low-pass filter producing an output signal that is the signal that approximately fits the like-polarity local peaks.

35. The threshold signal generator of claim 33, wherein each signal curve generator comprises:

a regression model that fits like-polarity peaks to a parameterized signal model according to an optimum fit criterion.

36. A system for binarizing an undifferentiated scan line signal imperfectly representing a binary optical code, the system comprising:

an equalizer having an input accepting the undifferentiated scan line signal, the equalizer producing an output that is an equalized undifferentiated scan line signal;

a first analog peak detector having an input accepting the equalized undifferentiated scan line signal, the first analog peak detector producing an output that approximates a top envelope of the equalized undifferentiated scan line signal;

a second analog peak detector having an input accepting the equalized undifferentiated scan line signal, the second analog peak detector producing an output that approximates a bottom envelope of the equalized undifferentiated scan line signal;

a threshold generator connected to the first analog peak detector and to the second analog peak detector, the threshold generator producing one or more threshold signals based on the outputs of the first analog peak detector and the second analog peak detector; and a binarizing comparator having inputs receiving the equalized undifferentiated scan line signal and the one or more threshold signals, the binarizing comparator producing a binary version of the equalized undifferentiated scan line signal based on the one or more threshold signals.

37. The system of claim 36, further comprising:

an offset adjuster having an input accepting the undifferentiated scan line signal and producing an output that is connected to the input of the equalizer.

38. The system of claim 36, wherein the one or more threshold signals comprise:

a binarizing threshold that is an average of the outputs of the first and second peak detectors.

39. The system of claim 38, wherein the one or more threshold signals comprise:

a print contrast threshold that is a predetermined percentage less than the output of the first peak detector.

40. The system of claim 39, wherein the binarizing comparator produces a binary high output when the equalized undifferentiated scan line signal exceeds both the binarizing threshold and the print contrast threshold.

41. The system of claim 38, wherein the one or more threshold signals comprise:

a modulation depth threshold, wherein the modulation depth threshold is a constant larger than a noise floor of the system.

42. The system of claim 41, wherein the binarizing comparator produces a binary high output when both the equalized undifferentiated scan line signal exceeds the binarizing threshold and the difference between the first and second peak detectors exceeds the modulation depth threshold.

43. A system for binarizing an undifferentiated scan line signal imperfectly representing a binary optical code, the system comprising:

an equalizer having an input accepting the undifferentiated scan line signal, the equalizer producing an output that is an equalized undifferentiated scan line signal;

a first analog peak detector having an input accepting the equalized undifferentiated scan line signal, the first analog peak detector producing an output that approximates a top envelope of the equalized undifferentiated scan line signal, the first peak detector having a first decay time constant;

a second analog peak detector having an input accepting the equalized undifferentiated scan line signal, the second analog peak detector producing an output that approximates a bottom envelope of the equalized undifferentiated scan line signal, the second peak detector having a second decay time constant approximately equal to the first time constant;

a third analog peak detector having an input accepting the equalized undifferentiated scan line signal, the third analog peak detector producing an output that approximates a bottom envelope of the equalized undifferentiated scan line signal, the third peak detector having a third decay time constant longer than either the first of the second decay time constant;

a threshold generator connected to the first, second, and third peak detectors, the threshold generator producing a threshold signal on the basis of the outputs of the first, second, and third analog peak detector; and a binarizing comparator having inputs receiving the equalized undifferentiated scan line signal and the threshold signal, the binarizing comparator producing an output signal that is high only when the equalized undifferentiated scan line signal exceeds the threshold signal.

44. The system of claim 43, wherein the threshold signal is computed as ½ (White+BlackLevel) where BlackLevel=min ($V_L$, LocalBlack), $V_L$=½ (White−GlobalBlack), White =the output of the first peak detector, LocalBlack=the output of the second peak detector, and GlobalBlack=the output of the third peak detector.

* * * * *